United States Patent
Wong et al.

(10) Patent No.: US 9,756,578 B2
(45) Date of Patent: Sep. 5, 2017

(54) SYSTEMS AND METHODS FOR TRANSMIT POWER CONTROL

(71) Applicant: QUALCOMM Incorporated, San Diego, CA (US)

(72) Inventors: Angelica Wong, Palo Alto, CA (US); Haitao Gan, Santa Clara, CA (US); Rainer Gaethke, San Francisco, CA (US); Niranjan Anand Talwalkar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/684,003

(22) Filed: Apr. 10, 2015

(65) Prior Publication Data

US 2016/0302159 A1    Oct. 13, 2016

(51) Int. Cl.
*H04B 5/00*    (2006.01)
*H04W 52/24*    (2009.01)

(52) U.S. Cl.
CPC ........ *H04W 52/246* (2013.01); *H04B 5/0012* (2013.01); *H04B 5/0075* (2013.01); *H04W 52/245* (2013.01)

(58) Field of Classification Search
CPC . H04W 52/246; H04W 52/245; H04B 5/0012
USPC .............. 455/41.1, 41.2, 41.3, 522
See application file for complete search history.

(56) References Cited

U.S. PATENT DOCUMENTS

| | | | | |
|---|---|---|---|---|
| 7,944,984 B1 * | 5/2011 | Wu | ............... | H04L 27/364 375/261 |
| 8,064,873 B2 * | 11/2011 | Wu | ............... | G06K 7/0008 340/10.1 |
| 8,565,343 B1 * | 10/2013 | Husted | ............... | H04B 1/0475 375/297 |
| 2003/0036359 A1 * | 2/2003 | Dent | ............... | H04L 27/367 455/63.1 |
| 2003/0045297 A1 * | 3/2003 | Dent | ............... | H04L 1/243 455/450 |
| 2004/0203468 A1 * | 10/2004 | Dent | ............... | H04B 7/022 455/67.14 |
| 2006/0035620 A1 * | 2/2006 | Millard | ............... | H04B 1/1036 455/339 |

(Continued)

FOREIGN PATENT DOCUMENTS

DE    102009045186 A1    4/2011
KR    100904672 B1    6/2009

OTHER PUBLICATIONS

Kisseleff S., et al., "Transmitter-Side Channel Estimation in Magnetic Induction based Communication Systems," IEEE International Black Sea Conference on Communications and Networking (BlackSeaCom), 2014, pp. 16-21.

(Continued)

*Primary Examiner* — Md Talukder
(74) *Attorney, Agent, or Firm* — Austin Rapp & Hardman

(57) ABSTRACT

A method for inductively coupled communication is described. The method includes transmitting a carrier signal from a first device while receiving the carrier signal at a receiver of the first device. The method also includes determining a carrier level estimation using a loopback path on the receiver of the first device. The method further includes controlling a transmit power level of the first device based on a coupling strength with a second device as indicated by the carrier level estimation.

26 Claims, 7 Drawing Sheets

(56) References Cited

U.S. PATENT DOCUMENTS

| | | | |
|---|---|---|---|
| 2008/0144539 A1* | 6/2008 | Sperlich | H04L 5/1469 370/278 |
| 2010/0161004 A1* | 6/2010 | Najafi | A61N 1/3787 607/60 |
| 2010/0240324 A1 | 9/2010 | Okada | |
| 2011/0063993 A1* | 3/2011 | Wilson | G06F 3/044 370/254 |
| 2011/0202316 A1 | 8/2011 | Crooks | |
| 2011/0300808 A1* | 12/2011 | Rokhsaz | H03J 3/20 455/67.11 |
| 2012/0052822 A1* | 3/2012 | Monroe | H04B 1/0071 455/90.2 |
| 2013/0109324 A1* | 5/2013 | Garrett | H04B 7/0408 455/73 |
| 2014/0250309 A1* | 9/2014 | Dietze | G06F 1/26 713/300 |
| 2014/0304094 A1* | 10/2014 | Reddy | G02B 6/0073 705/17 |
| 2015/0079903 A1* | 3/2015 | Song | G06K 7/10217 455/41.1 |
| 2015/0103809 A1* | 4/2015 | Karimi | H04W 52/246 370/336 |
| 2015/0130594 A1* | 5/2015 | Frederick | G06K 7/10009 340/10.2 |
| 2016/0302159 A1* | 10/2016 | Wong | H04B 5/0075 |

OTHER PUBLICATIONS

International Search Report and Written Opinion—PCT/US2016/021584—ISA/EPO—May 19, 2016.

\* cited by examiner

SYSTEMS AND METHODS FOR TRANSMIT POWER CONTROL

TECHNICAL FIELD

The present disclosure relates generally to wireless communications. More specifically, the present disclosure relates to transmit power control using a receiver loopback path.

BACKGROUND

Advances in technology have resulted in smaller and more powerful personal computing devices. For example, there currently exists a variety of portable personal computing devices, including wireless computing devices, such as portable wireless telephones, personal digital assistants (PDAs) and paging devices that are each small, lightweight and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs. Further, such devices are being manufactured to enable communications using a variety of frequencies and applicable coverage areas, such as cellular communications, wireless local area network (WLAN) communications, radio-frequency identification (RFID), near field communication (NFC), etc.

When an inductively (i.e., magnetically) coupled communication (e.g., RFID, NFC) is implemented, an inductively coupled communication device may send signals to another inductively coupled communication device. The transmit power level requirements may vary based on the coupling strength between the antennas of the two inductively coupled communication devices. Therefore, benefits may be realized by controlling the transmit power using a receiver loopback path that indicates whether there is a strong or weak coupling.

SUMMARY

A method for inductively coupled communication is described. The method includes transmitting a carrier signal from a first device while receiving the carrier signal at a receiver of the first device. The method also includes determining a carrier level estimation using a loopback path on the receiver of the first device. The method further includes controlling a transmit power level of the first device based on a coupling strength with a second device as indicated by the carrier level estimation.

Transmitting the carrier signal from the first device may include transmitting the carrier signal at a first transmit power level during a period before carrier signal modulation.

The loopback path may include a carrier estimation path that bypasses a band-pass filter on the receiver. Determining the carrier level estimation may include measuring a baseband or DC level of a down-converted carrier signal.

The loopback path may include a field detect path that bypasses a mixer on the receiver. Determining the carrier level estimation may include measuring a root mean square (RMS) amplitude of the carrier signal.

Controlling the transmit power level of the first device may include determining whether the carrier level estimation is less than a voltage threshold while transmitting the carrier signal at a first transmit power level. The transmit power level of the first device may be adjusted to a second transmit power level that is less than the first transmit power level when the carrier level estimation is less than the voltage threshold. When the carrier level estimation is less than the voltage threshold, the first device is determined to have a strong coupling with the second device.

The method may further include calibrating the voltage threshold to indicate a strong coupling between the first device and the second device. Calibrating the voltage threshold may include determining a reference carrier level estimation when there is no coupling between the first device and another device. The voltage threshold may be set at a percentage below the reference carrier level estimation. The percentage may be selected to indicate a strong coupling between the first device and the second device.

The first device may be an initiator near field communication (NFC) device. The second device may be a target NFC device.

Controlling the transmit power level of the first device may occur once at the start of a communication session with the second device. Alternatively, controlling the transmit power level of the first device may occur at the start of each transmit packet in a communication session with the second device.

An electronic device for inductively coupled communication is also described. The electronic device includes a processor, memory in electronic communication with the processor, and instructions stored in the memory. The instructions are executable by the processor to transmit a carrier signal from the electronic device while receiving the carrier signal at a receiver of the electronic device. The instructions are also executable by the processor to determine a carrier level estimation using a loopback path on the receiver of the electronic device. The instructions are further executable by the processor to control a transmit power level of the electronic device based on a coupling strength with a second device as indicated by the carrier level estimation.

A computer-program product for inductively coupled communication is also described. The computer-program product includes a non-transitory computer-readable medium having instructions thereon. The instructions include code for causing an electronic device to transmit a carrier signal from the electronic device while receiving the carrier signal at a receiver of the electronic device. The instructions also include code for causing the electronic device to determine a carrier level estimation using a loopback path on the receiver of the electronic device. The instructions further include code for causing the electronic device to control a transmit power level of the electronic device based on a coupling strength with a second device as indicated by the carrier level estimation.

An apparatus for inductively coupled communication is also included. The apparatus includes means for transmitting a carrier signal from the apparatus while receiving the carrier signal at a receiver of the apparatus. The apparatus also includes means for determining a carrier level estimation using a loopback path on the receiver of the apparatus. The apparatus further includes means for controlling a transmit power level of the apparatus based on a coupling strength with a second device as indicated by the carrier level estimation.

DETAILED DESCRIPTION

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
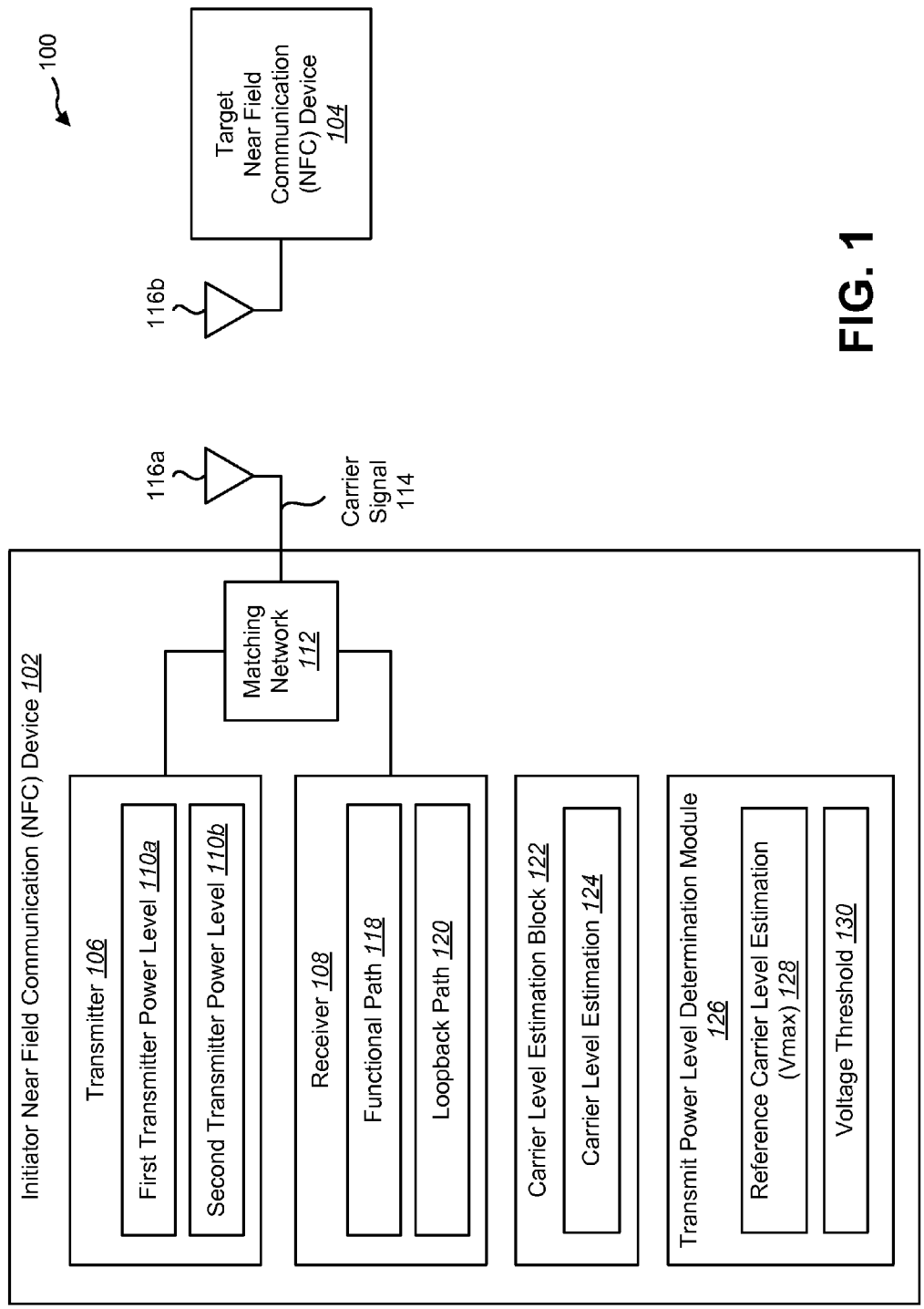
FIG. 1 is a block diagram illustrating one configuration of a wireless communication system in which transmit power control may be implemented.

FIG. 1 is a block diagram illustrating one configuration of a wireless communication system 100 in which transmit power control may be implemented. The wireless communication system 100 may include an initiator NFC device 102. The initiator NFC device 102 may communicate with a target NFC device 104. The initiator NFC device 102 may also be referred to as a poller, polling device or initiator. The target NFC device 104 may also be referred to as a listener, listening device or target.

NFC is an inductively coupled communication. Therefore, the initiator NFC device 102 and the target NFC device 104 may also be referred to as an inductively coupled communication device. The antenna 116a of the initiator NFC device 102 produces a radiated field (also referred to as a magnetic field or an electromagnetic field) that is received by the antenna 116b of the target NFC device 104.

The initiator NFC device 102 and the target NFC device 104 may use one or more NFC signaling technologies to communicate with each other. The NFC signaling technologies may include NFC-A, NFC-B and NFC-F. NFC-A may be referred to as type-A, NFC-B may be referred to as type-B and NFC-F may be referred to as type-F. The NFC signaling technologies differ in the modulation schemes employed.

NFC has four different tag types, which support a subset of the NFC signaling technologies. Type 1 tags (T1T) use NFC-A communication without data collision protection. Type 2 tags (T2T) use NFC-B communication with anti-collision. Type 3 tags (T3T) use NFC-F communication with anti-collision. Type 4 tags (T4T) can use either NFC-A (T4AT) or NFC-B (T4BT) with anti-collision.

It should be noted that while FIG. 1 describes NFC, the systems and methods described herein may be applied to other inductively coupled communication technologies. For example, the systems and methods described herein may be applied to ISO data types or RFID.

In one configuration, the initiator NFC device 102 and the target NFC device 104 may be operable to communicate using NFC through various interfaces, such as a frame radio frequency (RF) interface, International Organization for Standardization (ISO)-data exchange protocol (DEP) RF interface and NFC-DEP RF interface. In another configuration, the initiator NFC device 102 and the target NFC device 104 may establish an NFC-DEP RF protocol based communication link with link layer connections defined through a logical link control protocol (LLCP). In still another configuration, the initiator NFC device 102 and the target NFC device 104 may be operable to be connected to an access network and/or core network (e.g., a CDMA network, a GPRS network, a UMTS network, and other types of wireline and wireless communication networks).

In NFC operation, the initiator NFC device 102 may poll for nearby NFC devices. The target NFC device 104 may begin to listen when it comes within a few centimeters of the initiator NFC device 102. The initiator NFC device 102 will then communicate with the target NFC device 104 in order to determine which signaling technologies can be used. In one case, the initiator NFC device 102 may be acting as a reader. For example, a user may place a target NFC device 104 in the vicinity of the initiator NFC device 102 to initiate a payment transaction.

The coupling between the NFC devices 102, 104 may be weak (i.e., loose) or strong (i.e., tight) depending on the variation in antenna 116 sizes and the distance between the NFC devices. As used herein, "coupling" refers to the inductive (i.e., magnetic) coupling between the antenna 116a of the initiator NFC device 102 and the antenna 116b of the target NFC device 104.

When the initiator NFC device 102 and the target NFC device 104 are far apart, the coupling between the antennas 116a-b may be weak. However, as the initiator NFC device 102 and the target NFC device 104 are brought closer together, the coupling between the antennas 116a-b may be stronger. Furthermore, if the antenna 116a of the initiator NFC device 102 is small and the antenna 116b of the target NFC device 104 is large, then the coupling between the antennas 116a-b may be weak, even when the initiator NFC device 102 is near the target NFC device 104. However, if both antennas 116a-b are small, then the coupling between the antennas 116a-b may be strong when the initiator NFC device 102 is near the target NFC device 104.

The NFC Forum specifications provide a minimum field strength (Hmin) and a maximum field strength (Hmax) that an initiator NFC device 102 should maintain during communications with the target NFC device 104. If the transmit power level 110 of an initiator NFC device 102 is too high, this may violate the Hmax requirements. Conversely, if the transmit power level 110 of an initiator NFC device 102 is too low, it may violate the Hmin requirements. However, the field strength may vary as the distance between the initiator NFC device 102 and the target NFC device 104 varies.

In current approaches for NFC communications, a transmitting initiator NFC device 102 may have a fixed transmit power level 110. For a loosely coupled antenna 116 scenario, the initiator NFC device 102 may not violate the Hmax specifications, but the initiator NFC device 102 may violate the Hmin specification. Similarly, for a tightly coupled antenna 116 scenario, the initiator NFC device 102 may violate the Hmax requirements. The Hmin and Hmax requirements cannot be simultaneously satisfied with a fixed transmit power level setting for different antenna 116 pairs and distances between the initiator NFC device 102 and the target NFC device 104.

Therefore, a challenge in NFC is to provide a maximum power transfer from an initiator NFC device 102 that is loosely coupled with a target NFC device 104, yet not violate the Hmax requirements when it is tightly coupled. When the coupling between the antennas 116a-b is weak, it is desirable to use a maximum transmit power level 110 to communicate with all the possible NFC tags and devices at the furthest distance. However, if the same transmit power level 110 is used and the coupling between the antennas 116a-b becomes strong (because the initiator NFC device 102 and the target NFC device 104 are brought closer, for instance), the initiator NFC device 102 may violate the Hmax conditions and waste power. Instead of using a fixed transmit power level, it may be beneficial to control the transmit power level of the initiator NFC device 102 based on the coupling strength between the initiator NFC device 102 and the target NFC device 104.

A procedure is described to dynamically adjust the initiator NFC device 102 transmitter 106 power by controlling the transmit power level 110 according to a measured loopback carrier level. A carrier level estimation 124 may be measured using a loopback path 120 on a receiver 108 of the initiator NFC device 102. The initiator NFC device 102 may then control the transmit power level 110 of the initiator NFC device 102 based on the coupling strength with the target NFC device 104, as indicated by the carrier level estimation 124. In one implementation, the initiator NFC device 102 may determine whether it is in a tightly coupled system 100 or a loosely coupled system 100 and it may adjust the transmit power level accordingly.

In NFC, the initiator NFC device 102 may generate a carrier signal 114 to communicate with the target NFC device 104. The carrier signal 114 may be an RF field generated by a transmitter 106. The initiator NFC device 102 may modulate the carrier signal 114 to send information (e.g., data) to the target NFC device 104. Once the target NFC device 104 receives that signal, the initiator NFC device 102 may transmit a continuous wave to maintain the RF field. The continuous wave may have a carrier frequency. In the case of NFC, the carrier frequency may be 13.56 megahertz (MHz).

When the system 100 is tightly coupled, this causes a reduction in the carrier level (i.e., the transmitted voltage at the antenna 116a). In other words, when the coupling is weak, the carrier level may be higher than when the coupling is strong. This variation in the carrier signal 114 may be used to help differentiate whether there is a tightly coupled system 100 or not.

In an initiator NFC device 102, the transmitter 106 transmits even when the initiator NFC device 102 is receiving. When the transmitter 106 is on, the receiver 108 is also on. Therefore, the receiver 108 may receive a carrier signal 114 that the transmitter 106 transmits. The receiver 108 may sense variations in the carrier signal 114 due to coupling. In one configuration, the transmitter 106 and receiver 108 may be coupled to the same matching network 112 that is coupled to an antenna 116a.

In NFC, there is a short continuous wave period when the initiator NFC device 102 starts generating the carrier signal 114 and before the initiator NFC device 102 or the target NFC device 104 modulates the carrier signal 114. This continuous wave period may occur at the start of a communication session with the target NFC device 104. The continuous wave period may also occur between each packet transmitted between the initiator NFC device 102 and the target NFC device 104.

During the continuous wave period, the receiver 108 of the initiator NFC device 102 may receive the transmitted carrier signal 114. In other words, the initiator NFC device 102 may simultaneously receive the carrier signal 114 that it transmits. The strength of the carrier signal 114 is referred to as the carrier level of the carrier signal 114. The carrier level may be measured at a particular point in a radio path of the receiver 108.

Figure 3:
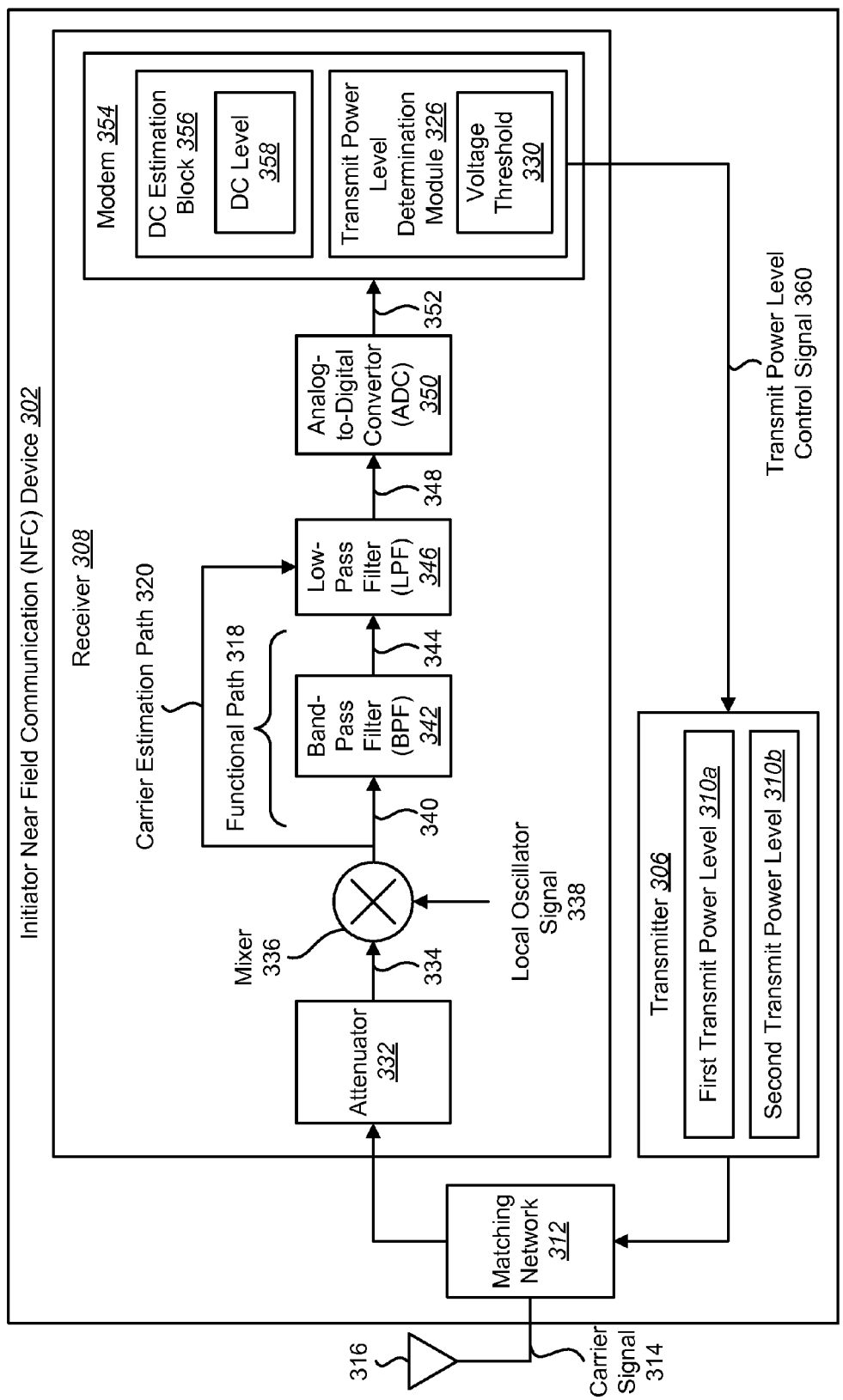
FIG. 3 is a block diagram illustrating one configuration of an initiator near field communication (NFC) device.
Figure 5:
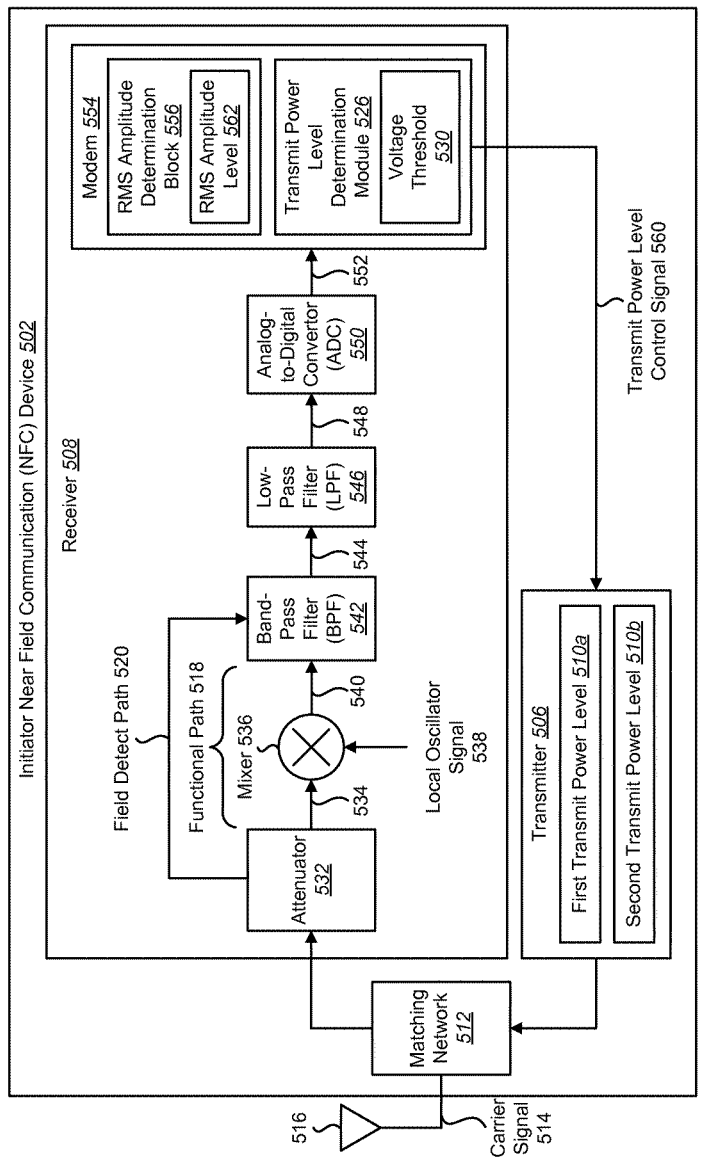
FIG. 5 is a block diagram illustrating another configuration of an initiator NFC device.

The initiator receiver 108 may include a functional path 118. Components that may be included in the functional path 118 may include an attenuator, mixer, band-pass filter (BPF), low-pass filter (LPF), analog-to-digital converter (ADC) and modem. Different configurations of an initiator receiver 108 are illustrated in FIG. 3 and FIG. 5. During normal operation (e.g., when not controlling the transmit power level 110), the signal 114 is processed using the functional path 118.

To determine a carrier level estimation 124, the initiator receiver 108 may include a loopback path 120. The loopback path 120 may be achieved in different configurations. In one configuration, the loopback path 120 may be a carrier estimation path that bypasses a band-pass filter on the receiver 108, as described in connection with FIG. 3. In another configuration, the loopback path 120 may be a field detect path that bypasses the mixer on the receiver 108, as described in connection with FIG. 5.

The initiator NFC device 102 may activate (e.g., enable) the loopback path 120 during the period before carrier signal 114 modulation. During this period, the carrier signal 114 may be received at the loopback path 120. A carrier level estimation block 122 may then determine a carrier level estimation 124. The initiator NFC device 102 may convert the analog carrier signal 114 to a digital signal that is measured by the carrier level estimation block 122.

In the approach where the loopback path 120 is a carrier estimation path, as described in FIG. 3, the initiator NFC device 102 may down-convert the carrier signal 114 to a baseband or DC signal. The carrier level estimation 124 may be determined by measuring the DC level of the down-converted carrier signal 114. For example, after down conversion, the DC level may include an in-phase component and a quadrature-phase component. The DC level may include two channels (e.g., paths). One channel may be an in-phase channel (I) and the other channel may be a quadrature-phase channel (Q). The DC level of the whole system corresponds to the carrier level.

The carrier level estimation block 122 may include a DC estimation block that estimates the carrier level by measuring the DC level. The carrier level estimation 124 may be determined according to Equation (1), where $V_{DC}$ is the DC level in volts. $I_{dc}$ and $Q_{dc}$ are the in-phase and quadrature components of the DC voltage.

$$V_{DC}=\sqrt{I_{dc}^2+Q_{dc}^2} \quad (1)$$

In the approach where the loopback path 120 is a field detect path, as described in FIG. 5, the field detect path bypasses the mixer of the receiver 108. The initiator NFC device 102 can sense the carrier signal 114 at the carrier frequency (e.g., 13.56 MHz). In other words, the initiator NFC device 102 may obtain a direct sample of the carrier signal 114 at the carrier frequency. Using the carrier signal 114 samples, the carrier level estimation block 122 can measure the root mean square (RMS) amplitude of the received carrier signal 114 to obtain the power of the carrier signal 114.

A voltage threshold 130 may be calibrated to indicate a strong coupling between the initiator NFC device 102 and the target NFC device 104. The voltage threshold 130 may be calibrated during a calibration phase. The calibration phase may be performed once during manufacturing or in real time to obtain the reference carrier level estimation (Vmax) 128. The reference carrier level estimation 128 may be obtained to establish the non-coupled carrier signal 114 level for the initiator NFC device 102. Vmax 128 may be a maximum voltage of the transmitted carrier signal 114 that is measured when there is no coupling between the initiator NFC device 102 and another NFC device.

For the carrier estimation path approach, Vmax 128 may be obtained by measuring the DC level with the gain of the receiver 108 set to detect the maximum carrier level. For the field detect path approach, Vmax 128 may be obtained by measuring the RMS amplitude of the carrier level with the gain of the receiver 108 set to detect the maximum carrier level.

The voltage threshold 130 may be set to be a percentage below the reference carrier level estimation 128. As described above, for the same transmit power level 110, the carrier level for strong coupling is lower than the carrier level for weak coupling. The voltage threshold 130, therefore, may be selected to be an amount below the reference carrier level estimation (Vmax) 128 that is considered to indicate a strong coupling. The percentage that is used to set the voltage threshold 130 may be selected to indicate a strong coupling between the initiator NFC device 102 and the target NFC device 104. If a carrier level falls below (e.g., is less than) the voltage threshold 130, then the initiator NFC device 102 is considered to be tightly coupled with the target NFC device 104. The percentage used to set the voltage threshold 130 may depend on the properties of the initiator NFC device 102 antenna 116a.

When initiating communication with the target NFC device 104, the initiator NFC device 102 may control the transmit power level 110 based on the coupling strength with the target NFC device 104 as indicated by the carrier level estimation 124. During the period before carrier signal 114 modulation (e.g., the continuous wave period), the initiator NFC device 102 may transmit the carrier signal 114 to the target NFC device 104 while receiving the carrier signal 114. During this initial period, the initiator NFC device 102 may perform a carrier loopback estimation to determine whether there is strong coupling or not.

The initiator NFC device 102 may transmit the carrier signal 114 at a first transmit power level 110a. The first transmit power level 110a may be a default maximum transmit power level 110. This maximum power level 110 may be initially used to ensure that the initiator NFC device 102 can communicate with all possible NFC tags and devices at the furthest distance.

While transmitting at the first transmit power level 110a, the carrier level estimation block 122 may determine a carrier level estimation 124 using the loopback path 120 on the receiver 108. This may be accomplished as described above.

A transmit power level determination module 126 may compare the measured carrier level estimation 124 with the voltage threshold 130. The transmit power level determination module 126 may be included in the receiver 108 or may be implemented elsewhere in the initiator NFC device 102. If the carrier level estimation 124 is not less than the voltage threshold 130, the initiator NFC device 102 is determined to have a weak coupling with the target NFC device 104. In this case it is beneficial to continue transmitting at the first transmit power level 110a.

However, if the carrier level estimation 124 is less than the voltage threshold 130, the initiator NFC device 102 is determined to have a strong coupling with the target NFC device 104. In this case, it is beneficial to lower the transmit power level 110 to ensure that the initiator NFC device 102 does not violate the Hmax conditions and waste power. Therefore, if the transmit power level determination module 126 determines that the carrier level estimation 124 is less than the voltage threshold 130, then the initiator NFC device 102 may adjust the transmit power level 110 of the transmitter 106 to a second transmit power level 110b. The second transmit power level 110b may be less than the first transmit power level 110a. In other words, if the carrier level estimation 124 is below the voltage threshold 130, the initiator NFC device 102 may then adjust the transmit power level 110 to a lower level.

In one configuration, the initiator NFC device 102 may control the transmit power level 110 once at the start of a communication session with the target NFC device 104. For example, when the initiator NFC device 102 first initiates communication with the target NFC device 104, the initiator NFC device 102 may determine whether to transmit using the first transmit power level 110a or the second transmit power level 110b based on the coupling strength. At the end of the communication session, the initiator NFC device 102 may return to the first transmit power level 110a, if needed.

In another configuration, the initiator NFC device 102 may control the transmit power level 110 at the start of each transmit packet in a communication session with the target NFC device 104. For example, the initiator NFC device 102 may repeat the procedures described herein at the start of each packet transmitted to or received from the target NFC device 104. At the end of each packet, the initiator NFC device 102 may return to the first transmit power level 110a, if needed, and the process may be repeated.

The described systems and methods may provide design flexibility and improve efficiency. The initiator NFC device 102 may adapt to different tags and its own antenna 116a. For example, the initiator NFC device 102 may transmit at a high first transmit power level 110a while initiating communications with the target NFC device 104. This may increase the probability of establishing communications in a weak coupling scenario (e.g., where the target NFC device 104 has a small antenna 116b or is far away). The initiator NFC device 102 may switch to a lower second transmit power level 110b in a strong coupling scenario, thus ensuring that it does not violate the Hmax conditions and waste power.

Figure 2:
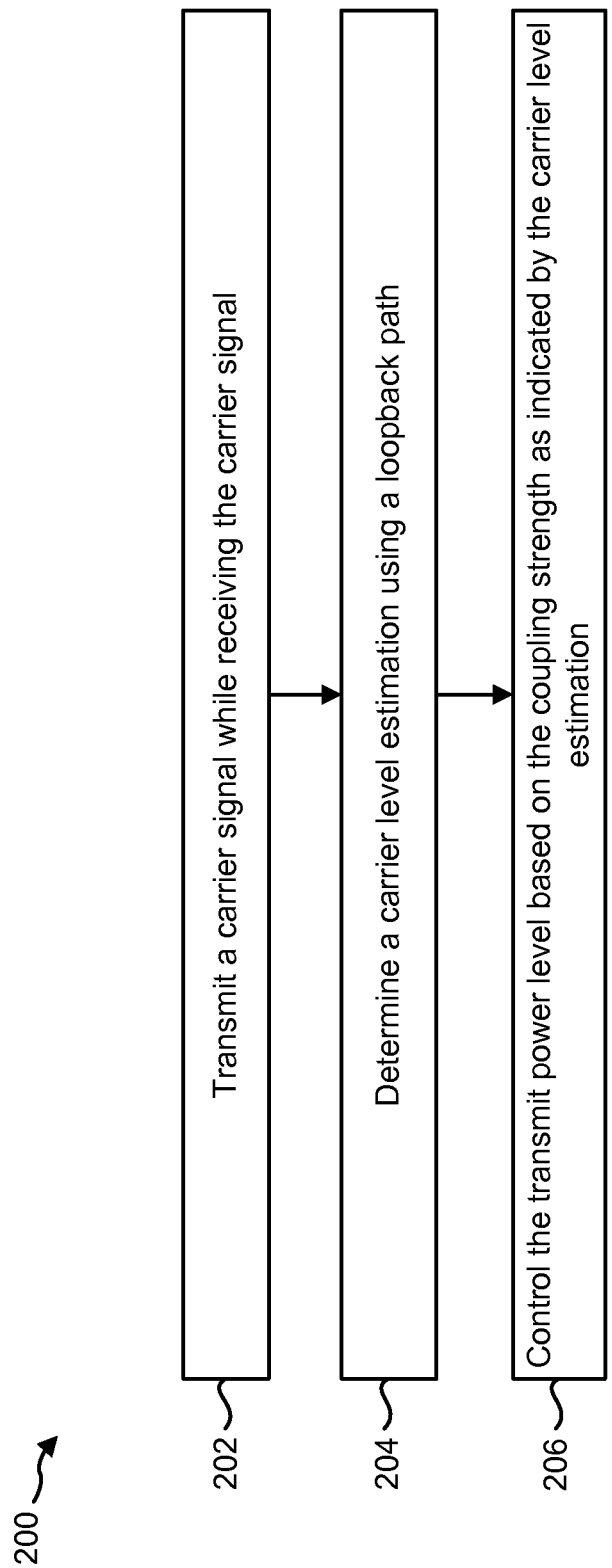
FIG. 2 is a flow diagram illustrating a method for transmit power control using a receiver loopback path.

FIG. 2 is a flow diagram illustrating a method 200 for transmit power control using a receiver 108 loopback path 120. The method 200 may be performed by an initiator NFC device 102. The initiator NFC device 102 may transmit 202 a carrier signal 114 while receiving the carrier signal 114 at the initiator NFC device 102. During a period before carrier signal modulation (e.g., a continuous wave period), the initiator NFC device 102 may transmit the carrier signal 114 to a target NFC device 104.

The initiator NFC device 102 may transmit the carrier signal 114 at a first transmit power level 110a. The first transmit power level 110a may be a default maximum transmit power level 110. When the transmitter 106 of the initiator NFC device 102 is on, the receiver 108 of the initiator NFC device 102 is also on. Therefore, the receiver 108 may receive a carrier signal 114 that the transmitter 106 transmits.

The initiator NFC device 102 may determine 204 a carrier level estimation 124 using a loopback path 120 on the receiver 108 of the initiator NFC device 102. The initiator NFC device 102 may activate the loopback path 120. In one configuration, the loopback path 120 may be a carrier estimation path that bypasses a band-pass filter on the receiver 108, as described in connection with FIG. 3. In another configuration, the loopback path 120 may be a field detect path that bypasses the mixer on the receiver 108, as described in connection with FIG. 5. A carrier level estimation block 122 may then obtain a carrier level estimation 124.

The initiator NFC device 102 may control 206 the transmit power level 110 based on the coupling strength with the target NFC device 104 as indicated by the carrier level estimation 124. For example, the initiator NFC device 102 may compare the measured carrier level estimation 124 with a voltage threshold 130 that is calibrated to indicate a strong coupling between the initiator NFC device 102 and target NFC device 104.

If the carrier level estimation 124 is not less than the voltage threshold 130, the initiator NFC device 102 is determined to have a weak coupling with the target NFC device 104. In this case, the initiator NFC device 102 may continue to transmit at the first transmit power level 110a.

However, if the carrier level estimation 124 is less than the voltage threshold 130, the initiator NFC device 102 is determined to have a strong coupling with the target NFC device 104. In this case, the initiator NFC device 102 may adjust the transmit power level 110 of the transmitter 106 to a second transmit power level 110b. The second transmit power level 110b may be less than the first transmit power level 110a. In other words, if the carrier level estimation 124 is below the voltage threshold 130, the initiator NFC device 102 may adjust the transmit power level 110 to a lower level.

FIG. 3 is a block diagram illustrating one configuration of an initiator NFC device 302. The initiator NFC device 302 may be implemented in accordance with the initiator NFC device 102 described in connection with FIG. 1.

The initiator NFC device 302 may include a transmitter 306, a receiver 308, a matching network 312 and an antenna 316. The transmitter 306 may transmit a carrier signal 314 using the antenna 316. The transmitter 306 may transmit the carrier signal 314 at a transmit power level 310 that may be adjusted according to a transmit power level control signal 360. For example, the transmitter 306 may switch between a first transmit power level 310a and a second transmit power level 310b according to the transmit power level control signal 360. The second transmit power level 310b may be lower than the first transmit power level 310a.

The receiver 308 may include one or more of an attenuator 332, a mixer 336 a band-pass filter (BPF) 342, a low-pass filter (LPF) 346, an analog-to-digital converter (ADC) 350 and a modem 354. The receiver 308 may be a zero-intermediate frequency (IF) receiver.

The attenuator 332 may attenuate the received carrier signal 314 so that the internal circuit can operate on it. The attenuator 332 may be implemented as a capacitive or resistive divider that may change its attenuation based on a control signal.

The mixer 336 may down-convert the attenuated signal 334 to baseband using a local oscillator signal 338. The down-converted signal 340 may be a DC and/or baseband signal that includes an I-channel and a Q-channel.

The down-converted signal 340 may then pass through a band-pass filter 342 and a low-pass filter 346 to prepare the baseband signal so the ADC 350 can sample it and convert it to a digital signal 352. The down-converted carrier signal 340 may be filtered out of the band-pass filtered signal 344, leaving the baseband signal 344. The low-pass filtered signal 348 may be provided to the ADC 350. A modem 354 may receive and process the digital signal 352. During normal operation, a functional path 318 may receive and process a modulated carrier signal 314.

When performing transmit power control, the received carrier signal 314 is only a carrier with no modulation. Because the receiver 308 is a zero-IF receiver, by bypassing the BPF 342, the mixed-down signal 340 would appear at baseband or DC. The receiver 308 can sense the down-converted carrier level, which is proportional to the DC level 358 that appears at the output of the receiver 308.

For transmit power control, the initiator NFC device 302 may enable a carrier estimation path 320 that bypasses the band-pass filter 342 to preserve the down-converted carrier level in order to obtain a carrier level estimation 124. The low-pass filter 346 may be maintained to provide anti-aliasing filtering for the ADC 350. For the carrier estimation path 320, the carrier signal 314 is received and down-converted to DC. Therefore, an analog DC level 358 that reflects the carrier signal 314 strength is received at the ADC 350.

The modem 354 may include a DC estimation block 356 that can process the digital signal 352 produced by the ADC 350 to determine a DC level 358 that corresponds to the carrier level estimation 124. This may include measuring the in-phase component (e.g., $I_{dc}$) and the quadrature-phase component (e.g., $Q_{dc}$) of the DC level 358. The DC level 358 may be determined according to Equation (1).

The modem 354 may also include a transmit power level determination module 326 to control the transmit power level 310 of the transmitter 306 based on the coupling strength with a second device (e.g., target NFC device 104) as indicated by the DC level 358. It should be noted that while the transmit power level determination module 326 is shown included in the modem 354, the transmit power level determination module 326 may be implemented in another location in the initiator NFC device 302. For example, the transmit power level determination module 326 may be implemented in a central processing unit (CPU) (not shown) of the initiator NFC device 302.

During a period before carrier signal modulation, the transmitter 306 may transmit the carrier signal 314 at a first transmit power level 310a (e.g., maximum transmit power level 310). The DC estimation block 356 may then determine the DC level 358 of the received carrier signal 314. The transmit power level determination module 326 may compare the measured DC level 358 with a voltage threshold 330 that is calibrated to indicate a strong coupling between the initiator NFC device 302 and a second device.

If the DC level 358 is not less than the voltage threshold 330, the initiator NFC device 302 is determined to have a weak coupling with the second device. In this case, the initiator NFC device 302 may continue to transmit at the first transmit power level 310a.

If the DC level 358 is less than the voltage threshold 330, the initiator NFC device 302 is determined to have a strong coupling with the second device. In this case, the transmit power level determination module 326 may send a transmit power level control signal 360 to the transmitter 306 to adjust the transmit power level 310 of the transmitter 306. The transmit power level control signal 360 may cause the transmitter 306 to apply a second transmit power level 310b. The second transmit power level 310b may be less than the first transmit power level 310a.

Figure 4:
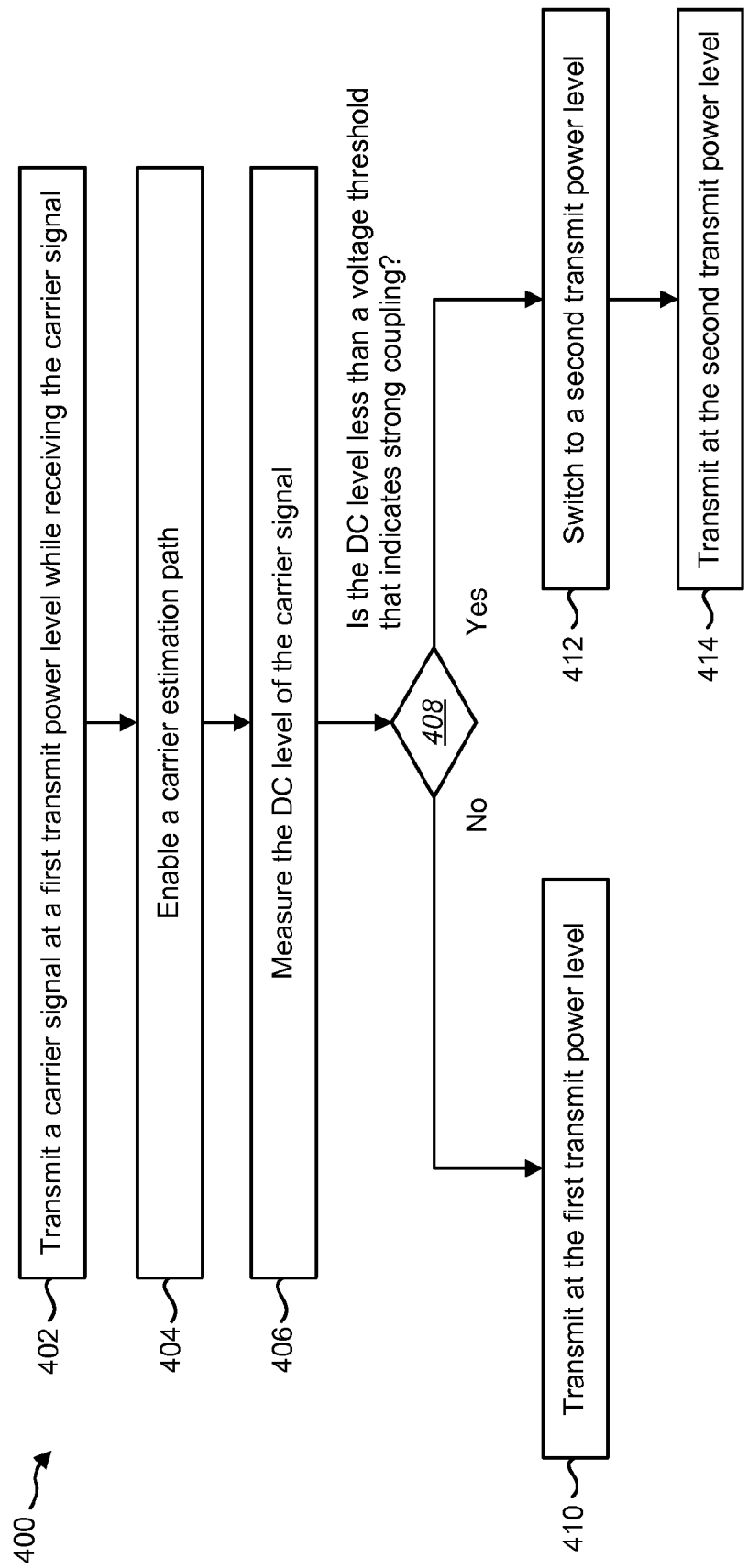
FIG. 4 is a flow diagram illustrating a method for transmit power control using a carrier estimation path in a receiver.

FIG. 4 is a flow diagram illustrating a method 400 for transmit power control using a carrier estimation path 320 in a receiver 308. The method 400 may be performed by an initiator NFC device 302. For example, the initiator NFC device 302 may be communicating with a target NFC device 104.

During a period before carrier signal modulation, the initiator NFC device 302 may transmit 402 a carrier signal 314 at a first transmit power level 310a while receiving the carrier signal 314. The first transmit power level 310a may be a default maximum transmit power level 310. The receiver 308 of the initiator NFC device 302 may receive the transmitted carrier signal 314.

The initiator NFC device 302 may enable 404 the carrier estimation path 320 during the period before carrier signal 314 modulation. The carrier estimation path 320 may preserve the DC level 358 of the carrier signal 314 by bypassing a band-pass filter 342.

The initiator NFC device 302 may measure 406 the DC level 358 of the carrier signal 314. For example, the initiator NFC device 302 may convert the analog carrier signal 314 to a DC level 358 that includes an in-phase channel ($I_{dc}$) and a quadrature-phase channel ($Q_{dc}$). The initiator NFC device 302 may measure 406 the DC level 358 according to the Equation (1).

The initiator NFC device 302 may determine 408 whether the DC level 358 is less than a voltage threshold 330 that is calibrated to indicate a strong coupling between the initiator NFC device 302 and target NFC device 104. If the DC level 358 is not less than the voltage threshold 330, the initiator NFC device 302 is determined to have a weak coupling with the target NFC device 104. In this case, the initiator NFC device 302 may enable the functional path 318 of the receiver 308, disable the carrier estimation path 320 and continue to transmit 410 at the first transmit power level 310a.

If the initiator NFC device 302 determines 408 that the DC level 358 is less than the voltage threshold 330, the initiator NFC device 302 is determined to have a strong coupling with the target NFC device 104. In this case, the initiator NFC device 302 may switch 412 the transmit power level 310 of the transmitter 306 to a second transmit power level 310b. The second transmit power level 310b may be less than the first transmit power level 310a. The initiator NFC device 302 may then enable the functional path 318 of the receiver 308, disable the carrier estimation path 320 and transmit 414 at the second transmit power level 310b.

FIG. 5 is a block diagram illustrating another configuration of an initiator NFC device 502. The initiator NFC device 502 may be implemented in accordance with the initiator NFC device 102 described in connection with FIG. 1.

The initiator NFC device 502 may include a transmitter 506, a receiver 508, a matching network 512 and an antenna 516. The transmitter 506 may transmit a carrier signal 514 using the antenna 516. The transmitter 506 may transmit the carrier signal 514 at a transmit power level 510, which may be adjusted according to a transmit power level control signal 560. For example, the transmitter 506 may switch between a first transmit power level 510a and a second transmit power level 510b according to the transmit power level control signal 560. The second transmit power level 510b may be lower than the first transmit power level 510a.

The receiver 508 may include one or more of an attenuator 532, a mixer 536, a band-pass filter (BPF) 542, a low-pass filter (LPF) 546, an analog-to-digital converter (ADC) 550 and a modem 554. The receiver 508 may be a zero-IF receiver.

The attenuator 532 may attenuate the received carrier signal 514 so that the internal circuit can operate on it. The attenuator 532 may be implemented as a capacitive or resistive divider that may change its attenuation based on a control signal.

The mixer 536 may down-convert the attenuated signal 534 to baseband using a local oscillator signal 538. The down-converted signal 540 may be a DC and/or baseband signal that includes an I-channel and a Q-channel.

The down-converted signal 540 may then pass through a band-pass filter 542 and a low-pass filter 546 to prepare the baseband signal so the ADC 550 can sample it and convert it to a digital signal 552. The down-converted carrier signal 540 may be filtered out of the band-pass filtered signal 544, leaving the baseband signal 544. The low-pass filtered signal 548 may be provided to the ADC 550. A modem 554 may receive and process the digital signal 552. During normal operation, a functional path 518 may receive and process a modulated carrier signal 514.

For transmit power control, the initiator NFC device 502 may enable a field detect path 520 that bypasses the mixer 536 on the receiver 508 to avoid down-converting the attenuated signal 534 to baseband. The low-pass filter 546 may be maintained to provide anti-aliasing filtering for the ADC 550. It should be noted that in this configuration, the corner frequency of the LPF 546 is not lower than the carrier frequency (e.g., 13.56 MHz).

The modem 554 may obtain a direct sample of the carrier signal 514 at the carrier frequency. Using the carrier signal 514 samples, an RMS amplitude determination block 556 can measure the RMS amplitude level 562 of the received carrier signal 514 to obtain the power of the carrier signal 514. This RMS amplitude level 562 corresponds to the carrier level estimation 124.

The modem 554 may also include a transmit power level determination module 526 to control the transmit power level 510 of the transmitter 506 based on the coupling strength with a second device (e.g., target NFC device 104), as indicated by the RMS amplitude level 562. It should be noted that while the transmit power level determination module 526 is shown included in the modem 554, the transmit power level determination module 526 may be implemented in another location in the initiator NFC device 502. For example, the transmit power level determination module 526 may be implemented in a central processing unit (CPU) (not shown) of the initiator NFC device 502.

During a period before carrier signal modulation, the transmitter 506 may transmit the carrier signal 514 at a first transmit power level 510a (e.g., maximum transmit power level 510). An RMS amplitude determination block 556 may then determine the RMS amplitude level 562 of the received carrier signal 514. The transmit power level determination module 526 may compare the measured RMS amplitude level 562 with a voltage threshold 530 that is calibrated to indicate a strong coupling between the initiator NFC device 502 and a second device.

If the RMS amplitude level 562 is not less than the voltage threshold 530, the initiator NFC device 502 is determined to have a weak coupling with the second device. In this case, the initiator NFC device 502 may continue to transmit at the first transmit power level 510a.

If the RMS amplitude level 562 is less than the voltage threshold 530, the initiator NFC device 502 is determined to have a strong coupling with the second device. In this case, the transmit power level determination module 526 may send a transmit power level control signal 560 to the transmitter 506 to adjust the transmit power level 510 of the transmitter 506. The transmit power level control signal 560 may cause the transmitter 506 to apply a second transmit power level 510b. The second transmit power level 510b may be less than the first transmit power level 510a.

Figure 6:
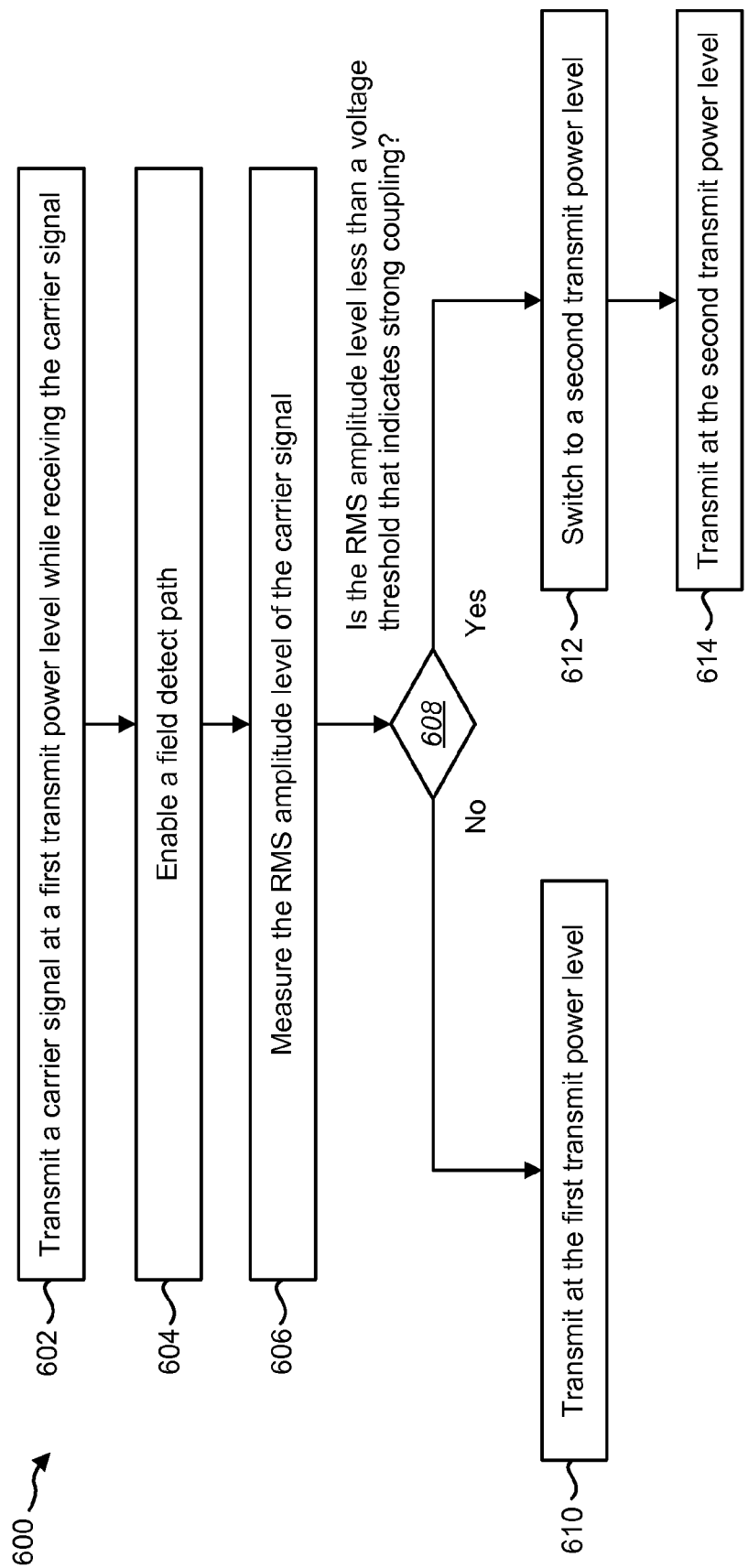
FIG. 6 is a flow diagram illustrating a method for transmit power control using a field detect path in a receiver.

FIG. 6 is a flow diagram illustrating a method 600 for transmit power control using a field detect path 520 in a receiver 508. The method 600 may be performed by an initiator NFC device 502. For example, the initiator NFC device 502 may be communicating with a target NFC device 104.

During a period before carrier signal 514 modulation, the initiator NFC device 502 may transmit 602 a carrier signal 514 at a first transmit power level 510a while receiving the carrier signal 514. The first transmit power level 510a may be a default maximum transmit power level 510. The receiver 508 of the initiator NFC device 502 may receive the transmitted carrier signal 514.

The initiator NFC device 502 may enable 604 the field detect path 520 during the period before carrier signal modulation. The field detect path 520 may avoid down-converting the carrier signal 514 by bypassing the mixer 536 of the receiver 508.

The initiator NFC device 502 may measure 606 the RMS amplitude level 562 of the carrier signal 514. For example, the initiator NFC device 502 may obtain a direct sample of the carrier signal 514 at the carrier frequency. Using the carrier signal 514 samples, the initiator NFC device 502 can measure the RMS amplitude level 562 of the received carrier signal 514 to obtain the power of the carrier signal 514.

The initiator NFC device 502 may determine 608 whether the RMS amplitude level 562 is less than a voltage threshold 530 that is calibrated to indicate a strong coupling between the initiator NFC device 502 and target NFC device 104. If the RMS amplitude level 562 is not less than the voltage threshold 530, the initiator NFC device 502 is determined to have a weak coupling with the target NFC device 104. In this case, the initiator NFC device 502 may enable the functional path 518 of the receiver 508, disable the field detect path 520 and continue to transmit 610 at the first transmit power level 510a.

If the initiator NFC device 502 determines 608 that the RMS amplitude level 562 is less than the voltage threshold 530, the initiator NFC device 502 is determined to have a strong coupling with the target NFC device 104. In this case, the initiator NFC device 502 may switch 612 the transmit power level 510 of the transmitter 506 to a second transmit power level 510b. The second transmit power level 510b may be less than the first transmit power level 510a. The initiator NFC device 502 may then enable the functional path 518 of the receiver 508, disable the field detect path 520 and transmit 614 at the second transmit power level 510b.

Figure 7:
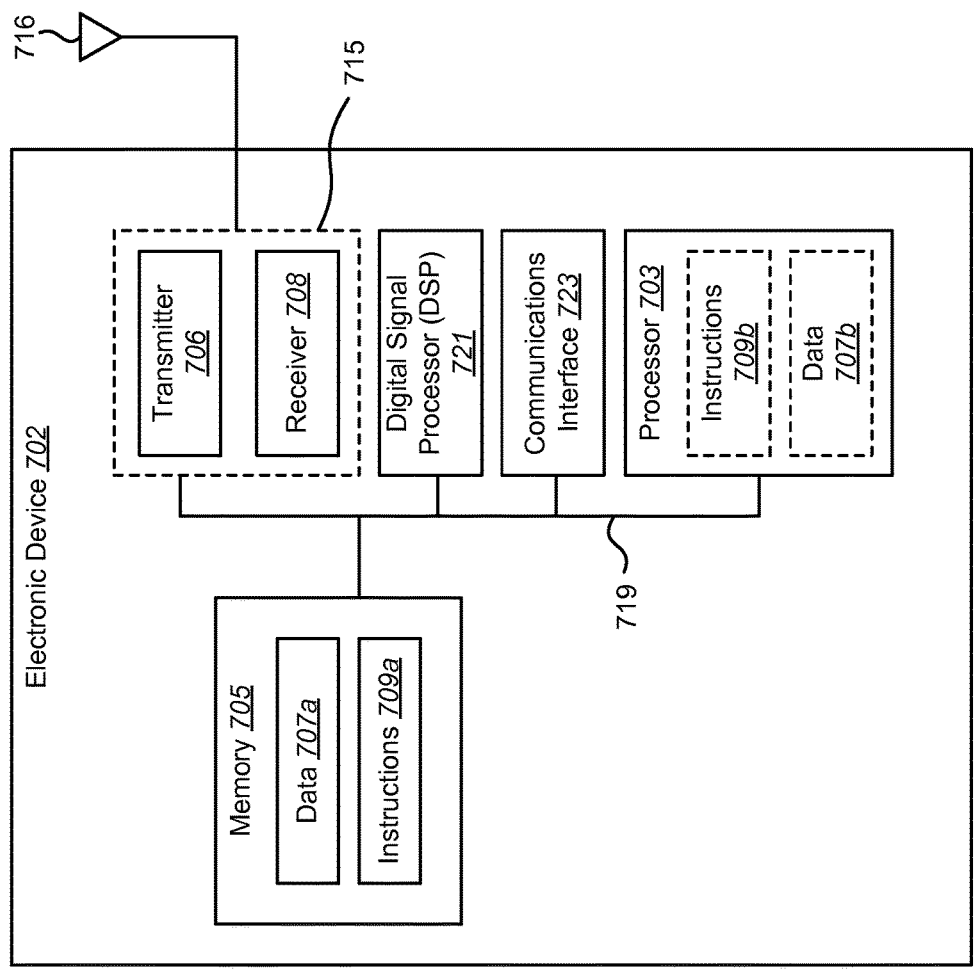
FIG. 7 illustrates certain components that may be included within an electronic device.

FIG. 7 illustrates certain components that may be included within an electronic device 702. The electronic device 702 may be an access terminal, a mobile station, a user equipment (UE), etc. For example, the electronic device 702 may be the initiator NFC device 102 of FIG. 1.

The electronic device 702 includes a processor 703. The processor 703 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 703 may be referred to as a central processing unit (CPU). Although just a single processor 703 is shown in the electronic device 702 of FIG. 7, in an alternative configuration, a combination of processors (e.g., an ARM and DSP) could be used.

The electronic device 702 also includes memory 705 in electronic communication with the processor 703 (i.e., the processor can read information from and/or write information to the memory). The memory 705 may be any electronic component capable of storing electronic information. The memory 705 may be configured as random access memory (RAM), read-only memory (ROM), magnetic disk storage media, optical storage media, flash memory devices in RAM, on-board memory included with the processor 703, EPROM memory, EEPROM memory, registers and so forth, including combinations thereof.

Data 707a and instructions 709a may be stored in the memory 705. The instructions 709a may include one or more programs, routines, sub-routines, functions, procedures, code, etc. The instructions 709a may include a single computer-readable statement or many computer-readable statements. The instructions 709a may be executable by the processor 703 to implement the methods disclosed herein. Executing the instructions 709a may involve the use of the data 707a that is stored in the memory 705. When the processor 703 executes the instructions 709, various portions of the instructions 709b may be loaded onto the processor 703, and various pieces of data 707b may be loaded onto the processor 703.

The electronic device 702 may also include a transmitter 706 and a receiver 708 to allow transmission and reception of signals to and from the electronic device 702 via an antenna 716. The transmitter 706 and receiver 708 may be collectively referred to as a transceiver 715. The electronic device 702 may also include (not shown) multiple transmitters, multiple antennas, multiple receivers and/or multiple transceivers.

The electronic device 702 may include a digital signal processor (DSP) 721. The electronic device 702 may also include a communications interface 723. The communications interface 723 may allow a user to interact with the electronic device 702.

The various components of the electronic device 702 may be coupled together by one or more buses, which may include a power bus, a control signal bus, a status signal bus, a data bus, etc. For the sake of clarity, the various buses are illustrated in FIG. 7 as a bus system 719.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2, FIG. 4 and FIG. 6 can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for inductively coupled communication, comprising:
   transmitting a carrier signal from a first device while receiving the transmitted carrier signal at a receiver of the first device;
   enabling a field detect path during a period before carrier signal modulation, wherein the field detect path bypasses down-converting the received transmitted carrier signal to baseband;
   determining a carrier level estimation of the received transmitted carrier signal using a loopback path on the receiver of the first device; and
   controlling a transmit power level of the first device based on a coupling strength with a second device as indicated by the carrier level estimation, wherein controlling the transmit power level comprises disabling the field detect path.

2. The method of claim 1, wherein transmitting the carrier signal from the first device comprises transmitting the carrier signal at a first transmit power level during the period before carrier signal modulation.

3. The method of claim 1, wherein the loopback path comprises the field detect path, wherein the field detect path bypasses a mixer on the receiver, and wherein determining the carrier level estimation comprises measuring a root mean square (RMS) amplitude of the carrier signal.

4. The method of claim 1, wherein controlling the transmit power level of the first device further comprises:
  determining whether the carrier level estimation is less than a voltage threshold while transmitting the carrier signal at a first transmit power level; and
  adjusting the transmit power level of the first device to a second transmit power level that is less than the first transmit power level when the carrier level estimation is less than the voltage threshold.

5. The method of claim 4, wherein when the carrier level estimation is less than the voltage threshold, the first device is determined to have a strong coupling with the second device.

6. The method of claim 4, further comprising calibrating the voltage threshold to indicate a strong coupling between the first device and the second device.

7. The method of claim 6, wherein calibrating the voltage threshold comprises:
  determining a reference carrier level estimation when there is no coupling between the first device and another device; and
  setting the voltage threshold at a percentage below the reference carrier level estimation, wherein the percentage is selected to indicate a strong coupling between the first device and the second device.

8. The method of claim 1, wherein the first device is an initiator near field communication (NFC) device and the second device is a target NFC device.

9. The method of claim 1, wherein controlling the transmit power level of the first device occurs once at the start of a communication session with the second device.

10. The method of claim 1, wherein controlling the transmit power level of the first device occurs at the start of each transmit packet in a communication session with the second device.

11. An electronic device for inductively coupled communication, comprising:
  a processor;
  memory in electronic communication with the processor; and
  instructions stored in the memory, the instructions being executable by the processor to:
  transmit a carrier signal from the electronic device while receiving the transmitted carrier signal at a receiver of the electronic device;
  enable a field detect path during a period before carrier signal modulation, wherein the field detect path bypasses down-converting the received transmitted carrier signal to baseband;
  determine a carrier level estimation of the received transmitted carrier signal using a loopback path on the receiver of the electronic device; and
  control a transmit power level of the electronic device based on a coupling strength with a second device as indicated by the carrier level estimation, wherein the instructions executable to control the transmit power level of the electronic device comprise instructions executable to disable the field detect path.

12. The electronic device of claim 11, wherein the instructions executable to transmit the carrier signal from the electronic device comprise instructions executable to transmit the carrier signal at a maximum transmit power level during the period before carrier signal modulation.

13. The electronic device of claim 11, wherein the loopback path comprises the field detect path, wherein the field detect path bypasses a mixer on the receiver, and wherein the instructions executable to determine the carrier level estimation comprise instructions executable to measure a root mean square (RMS) amplitude of the carrier signal.

14. The electronic device of claim 11, wherein the instructions executable to control the transmit power level of the electronic device further comprise instructions executable to:
  determine whether the carrier level estimation is less than a voltage threshold while transmitting the carrier signal at a first transmit power level; and
  adjust the transmit power level of the electronic device to a second transmit power level that is less than the first transmit power level when the carrier level estimation is less than the voltage threshold.

15. The electronic device of claim 14, wherein when the carrier level estimation is less than the voltage threshold, the electronic device is determined to have a strong coupling with the second device.

16. The electronic device of claim 14, further comprising instructions executable to calibrate the voltage threshold to indicate a strong coupling between the electronic device and the second device.

17. A non-transitory computer-readable medium having instructions thereon, the instructions comprising:
  code for causing an electronic device to transmit a carrier signal from the electronic device while receiving the transmitted carrier signal at a receiver of the electronic device;
  code for causing the electronic device to enable a field detect path during a period before carrier signal modulation, wherein the field detect path bypasses down-converting the received transmitted carrier signal to baseband;
  code for causing the electronic device to determine a carrier level estimation of the received transmitted carrier signal using a loopback path on the receiver of the electronic device; and
  code for causing the electronic device to control a transmit power level of the electronic device based on a coupling strength with a second device as indicated by the carrier level estimation, wherein the code for causing the electronic device to control the transmit power level comprises of the electronic device comprises code for causing the electronic device to disable the field detect path.

18. The non-transitory computer-readable medium of claim 17, wherein the loopback path comprises the field detect path, wherein the field detect path bypasses a mixer on the receiver, and wherein the code for causing the electronic device to determine the carrier level estimation comprises code for causing the electronic device to measure a root mean square (RMS) amplitude of the carrier signal.

19. The non-transitory computer-readable medium of claim 17, wherein the code for causing the electronic device to control the transmit power level of the electronic device further comprises:
  code for causing the electronic device to determine whether the carrier level estimation is less than a voltage threshold while transmitting the carrier signal at a first transmit power level; and
  code for causing the electronic device to adjust the transmit power level of the electronic device to a second transmit power level that is less than the first transmit power level when the carrier level estimation is less than the voltage threshold.

20. The non-transitory computer-readable medium of claim 19, wherein when the carrier level estimation is less than the voltage threshold, the electronic device is determined to have a strong coupling with the second device.

21. The non-transitory computer-readable medium of claim 19, further comprising code for causing the electronic device to calibrate the voltage threshold to indicate a strong coupling between the electronic device and the second device.

22. An apparatus for inductively coupled communication, comprising:
- means for transmitting a carrier signal from the apparatus while receiving the transmitted carrier signal at a receiver of the apparatus;
- means for enabling a field detect path during a period before carrier signal modulation, wherein the field detect path bypasses down-converting the received transmitted carrier signal to baseband;
- means for determining a carrier level estimation of the received transmitted carrier signal using a loopback path on the receiver of the apparatus; and
- means for controlling a transmit power level of the apparatus based on a coupling strength with a second device as indicated by the carrier level estimation, wherein the means for controlling the transmit power level of the apparatus comprises means for disabling the field detect path.

23. The apparatus of claim 22, wherein the loopback path comprises the field detect path, wherein the field detect path bypasses a mixer on the receiver, and wherein the means for determining the carrier level estimation comprise means for measuring a root mean square (RMS) amplitude of the carrier signal.

24. The apparatus of claim 22, wherein the means for controlling the transmit power level of the apparatus further comprises:
- means for determining whether the carrier level estimation is less than a voltage threshold while transmitting the carrier signal at a first transmit power level; and
- means for adjusting the transmit power level of the apparatus to a second transmit power level that is less than the first transmit power level when the carrier level estimation is less than the voltage threshold.

25. The apparatus of claim 24, wherein when the carrier level estimation is less than the voltage threshold, the apparatus is determined to have a strong coupling with the second device.

26. The apparatus of claim 24, further comprising means for calibrating the voltage threshold to indicate a strong coupling between the apparatus and the second device.

* * * * *